US010774752B2

United States Patent
Suciu et al.

(10) Patent No.: US 10,774,752 B2
(45) Date of Patent: Sep. 15, 2020

(54) INTEGRATED ENVIRONMENTAL CONTROL AND BUFFER AIR SYSTEM

(71) Applicant: United Technologies Corporation, Farmington, CT (US)

(72) Inventors: Gabriel L. Suciu, Glastonbury, CT (US); William K. Ackermann, East Hartford, CT (US); Harold W. Hipsky, Willington, CT (US)

(73) Assignee: Raytheon Technologies Corporation, Farmington, CT (US)

(*) Notice: Subject to any disclaimer, the term of this patent is extended or adjusted under 35 U.S.C. 154(b) by 1010 days.

(21) Appl. No.: 15/089,806

(22) Filed: Apr. 4, 2016

(65) Prior Publication Data

US 2017/0284305 A1 Oct. 5, 2017

(51) Int. Cl.
*F02C 9/00* (2006.01)
*F02C 9/18* (2006.01)
(Continued)

(52) U.S. Cl.
CPC ................ *F02C 9/18* (2013.01); *B64D 13/06* (2013.01); *F02C 3/04* (2013.01); *F02C 6/08* (2013.01);
(Continued)

(58) Field of Classification Search
CPC .... F02C 6/08; F02C 7/18; F02C 7/185; F02C 9/18; B64D 2013/0603; B64D 2013/0618
See application file for complete search history.

(56) References Cited

U.S. PATENT DOCUMENTS 2,871,671 A 2/1959 Bartlett, Jr. et al.
4,285,466 A 8/1981 Linscheid et al.
(Continued)

OTHER PUBLICATIONS

European Search Report for EP Application No. 17164289.5 dated Aug. 24, 2017.

*Primary Examiner* — Todd E Manahan
*Assistant Examiner* — Edwin Kang
(74) *Attorney, Agent, or Firm* — Carlson, Gaskey & Olds, P.C.

(57) ABSTRACT

An environmental control system for an aircraft includes a higher pressure tap to be associated with a higher compression location in a main compressor section associated with an aircraft engine, and a lower pressure tap to be associated with a lower pressure location in the main compressor section associated with the aircraft engine. The lower pressure location being at a lower pressure than said higher pressure location. The lower pressure tap communicates to a first passage leading to a downstream outlet, and having a second passage leading into a compressor section of a turbocompressor. The higher pressure tap leads into a turbine section of the turbocompressor such that air in the higher pressure tap drives the turbine section to in turn drive the compressor section of the turbocompressor. A turbine outlet receives airflow exhausted from the turbine section. A compressor outlet receives airflow exhausted from the compressor section. A combined outlet receives airflow from the turbine outlet and the compressor outlet intermixing airflow and passing the mixed airflow downstream to be delivered to an aircraft. A buffer air outlet communicates airflow to an engine buffer air system. The buffer air outlet receives airflow supplied to the turbocompressor. A gas turbine engine is also disclosed.

12 Claims, 4 Drawing Sheets

(51) Int. Cl.

| | |
|---|---|
| ***F02C 3/04*** | (2006.01) |
| ***F02C 7/06*** | (2006.01) |
| ***F02C 7/32*** | (2006.01) |
| ***B64D 13/06*** | (2006.01) |
| ***F02C 6/08*** | (2006.01) |

(52) U.S. Cl.

CPC .................. *F02C 7/06* (2013.01); *F02C 7/32* (2013.01); *B64D 2013/0618* (2013.01); *F05D 2220/323* (2013.01); *F05D 2260/213* (2013.01); *F05D 2260/606* (2013.01); *F05D 2260/98* (2013.01)

(56) References Cited

U.S. PATENT DOCUMENTS

| | | | | |
|---|---|---|---|---|
| 5,357,742 | A * | 10/1994 | Miller | B64D 33/08 244/53 B |
| 5,452,573 | A * | 9/1995 | Glickstein | F02C 6/08 60/39.183 |
| 6,412,270 | B1 | 7/2002 | Mortzheim et al. | |
| 6,647,730 | B2 | 11/2003 | Liu | |
| 6,684,660 | B1 | 2/2004 | Bruno et al. | |
| 7,171,819 | B2 | 2/2007 | Lui et al. | |
| 7,305,842 | B1 | 12/2007 | Schiff | |
| 7,785,066 | B2 | 8/2010 | Bil et al. | |
| 8,276,392 | B2 | 10/2012 | Van Der Woude | |
| 8,904,805 | B2 | 12/2014 | Hipsky et al. | |
| 2010/0107594 | A1* | 5/2010 | Coffinberry | F02C 6/08 60/39.093 |
| 2013/0098059 | A1* | 4/2013 | Suciu | F02C 9/16 60/783 |
| 2013/0174573 | A1* | 7/2013 | Hipsky | F02C 6/08 60/785 |
| 2014/0165588 | A1 | 6/2014 | Snape et al. | |
| 2014/0250898 | A1 | 9/2014 | Mackin et al. | |
| 2016/0090917 | A1 | 3/2016 | Bruno et al. | |
| 2016/0369705 | A1* | 12/2016 | Mackin | F02C 6/08 |

* cited by examiner

INTEGRATED ENVIRONMENTAL CONTROL AND BUFFER AIR SYSTEM

BACKGROUND OF THE INVENTION

This application relates to an environmental control system for an aircraft which utilizes both high and low pressure compressed air for uses on systems of an aircraft.

Environmental control systems utilize air tapped from the engine for use in various systems of the aircraft such as within the aircraft cabin. The systems typically selectively tap low pressure air from a lower pressure location, and higher pressure air from a higher pressure compressor location. The two locations are utilized at distinct times during the operation of a gas turbine engine, dependent on need, and available air.

Airflow tapped from the higher pressure locations is at temperatures higher than typically needed for an aircraft system and therefore requires cooling. An intercooler or heat exchanger is therefore required.

Airflow may also be diverted from core airflow for engine buffer systems. An engine buffer system provides air at a desired temperature and pressure to bearing locations within higher temperature sections of the engine. The airflow is provided to keep lubricant within the various bearing compartments and maintain compartment walls below a desired temperature.

Diversion of any airflow from the core flowpath requires conduits that add to structural and assembly complexity. Moreover, each tap from the engine structure can reduce overall engine efficiency.

SUMMARY OF THE INVENTION

In a featured embodiment, an environmental control system for an aircraft includes a higher pressure tap to be associated with a higher compression location in a main compressor section associated with an aircraft engine, and a lower pressure tap to be associated with a lower pressure location in the main compressor section associated with the aircraft engine. The lower pressure location being at a lower pressure than said higher pressure location. The lower pressure tap communicates to a first passage leading to a downstream outlet, and having a second passage leading into a compressor section of a turbocompressor. The higher pressure tap leads into a turbine section of the turbocompressor such that air in the higher pressure tap drives the turbine section to in turn drive the compressor section of the turbocompressor. A turbine outlet receives airflow exhausted from the turbine section. A compressor outlet receives airflow exhausted from the compressor section. A combined outlet receives airflow from the turbine outlet and the compressor outlet intermixing airflow and passing the mixed airflow downstream to be delivered to an aircraft. A buffer air outlet communicates airflow to an engine buffer air system. The buffer air outlet receives airflow supplied to the turbocompressor.

In another embodiment according to the previous embodiment, the turbocompressor includes a housing supporting the compressor section and the buffer air outlet is within the housing.

In another embodiment according to any of the previous embodiments, the buffer air outlet is within the housing and upstream of the compressor section.

In another embodiment according to any of the previous embodiments, the buffer air outlet is within the housing and downstream of the compressor section.

In another embodiment according to any of the previous embodiments, the buffer air outlet includes a first outlet within the housing upstream of the compressor section and a second outlet downstream of the compressor section.

In another embodiment according to any of the previous embodiments, includes a check valve controlling airflow from the lower pressure tap through a bypass passage between the lower pressure tap and the combined outlet.

In another embodiment according to any of the previous embodiments, a first control valve is positioned on the higher pressure tap and is operable to control operation of the turbocompressor. When the first control valve is in an open position, airflow is drawn into the compressor section of the turbocompressor from the lower pressure tap, and when the first control valve is in a closed position, airflow is not drawn through the compressor section of the turbocompressor and passes through the bypass passage.

In another embodiment according to any of the previous embodiments, includes a second control valve controlling airflow to the aircraft.

In another embodiment according to any of the previous embodiments, the second control valve is positioned downstream of a location at which the bypass passage and the combined outlet intermix into a common conduit.

In another embodiment according to any of the previous embodiments, includes a heat exchanger within the common conduit after the second control valve. The heat exchanger cools airflow through the common conduit.

In another featured embodiment, a gas turbine engine includes a fan section delivering air into a main compressor section where the air is compressed and communicated to a combustion section where the air is mixed with fuel and ignited to generate a high energy flow that is expanded through a turbine section that drives the fan and main compressor section. An environmental control system includes a higher pressure tap to be associated with a higher compression location in the main compressor section, and a lower pressure tap to be associated with a lower pressure location in the main compressor section. The lower pressure location being at a lower pressure than said higher pressure location. The lower pressure tap communicates to a first passage leading to a downstream outlet, and having a second passage leading into a compressor section of a turbocompressor. The higher pressure tap leads into a turbine section of the turbocompressor such that air in the higher pressure tap drives the turbine section of the turbocompressor to in turn drive the compressor section of the turbocompressor. A turbine outlet receives airflow exhausted from the turbine section of the turbocompressor. A compressor outlet receives airflow exhausted from the compressor section of the turbocompressor. A combined outlet receives airflow from the turbine outlet and the compressor outlet intermixing airflow and passing the mixed airflow downstream to be delivered to an aircraft. A buffer air outlet communicates airflow to an engine buffer air system. The buffer air outlet receives airflow supplied to the turbocompressor.

In another embodiment according to the previous embodiment, the turbocompressor includes a housing supporting the compressor section of the turbocompressor and the buffer air outlet is within the housing.

In another embodiment according to any of the previous embodiments, the buffer air outlet is within the housing and upstream of the compressor section of the turbocompressor.

In another embodiment according to any of the previous embodiments, the buffer air outlet is within the housing and downstream of the compressor section of the turbocompressor.

In another embodiment according to any of the previous embodiments, includes a check valve controlling airflow from the lower pressure tap through a bypass passage between the lower pressure tap and the combined outlet.

In another embodiment according to any of the previous embodiments, a first control valve is positioned on the higher pressure tap and is operable to control operation of the turbocompressor. When the first control valve is in an open position, airflow is drawn into the compressor section of the turbocompressor from the lower pressure tap, and when the first control valve is in a closed position, airflow is not drawn through the compressor section of the turbocompressor and passes through the bypass passage.

In another embodiment according to any of the previous embodiments, includes a second control valve operable to control airflow to the aircraft.

In another embodiment according to any of the previous embodiments, the second control valve is positioned downstream of a location at which the bypass passage and the combined outlet intermix into a common conduit.

In another embodiment according to any of the previous embodiments, includes a heat exchanger within the common conduit after the second control valve. The heat exchanger cools airflow through the common conduit.

In another featured embodiment, an environmental control system for an aircraft includes a higher pressure tap to be associated with a higher compression location in a main compressor section associated with an aircraft engine, and a lower pressure tap to be associated with a lower pressure location in the main compressor section associated with the aircraft engine. The lower pressure location being at a lower pressure than said higher pressure location. The lower pressure tap communicates to a first passage leading to a downstream outlet, and having a second passage leading into a compressor section of a turbocompressor. The higher pressure tap leads into a turbine section of the turbocompressor such that air in the higher pressure tap drives the turbine section to in turn drive the compressor section of the turbocompressor. A turbine outlet receives airflow exhausted from the turbine section. A compressor outlet receives airflow exhausted from the compressor section. A combined outlet receives airflow from the turbine outlet and the compressor outlet intermixing airflow and passing the mixed airflow downstream to be delivered to an aircraft. A housing supports the compressor section and a buffer air outlet is within the housing. The buffer air outlet communicates airflow to an engine buffer air system. A check valve controls airflow from the lower pressure tap through a bypass passage between the lower pressure tap and the combined outlet. A first control valve is positioned on the higher pressure tap and is operable to control operation of the turbocompressor. When the first control valve is in an open position, airflow is drawn into the compressor section of the turbocompressor from the lower pressure tap, and when the first control valve is in a closed position, airflow is not drawn through the compressor section of the turbocompressor and passes through the bypass passage. A second control valve is positioned downstream of a location at which the bypass passage and the combined outlet intermix into a common conduit operable to control airflow through a common conduit to an aircraft system.

These and other features of the invention would be better understood from the following specifications and drawings, the following of which is a brief description.

DETAILED DESCRIPTION

Figure 1:
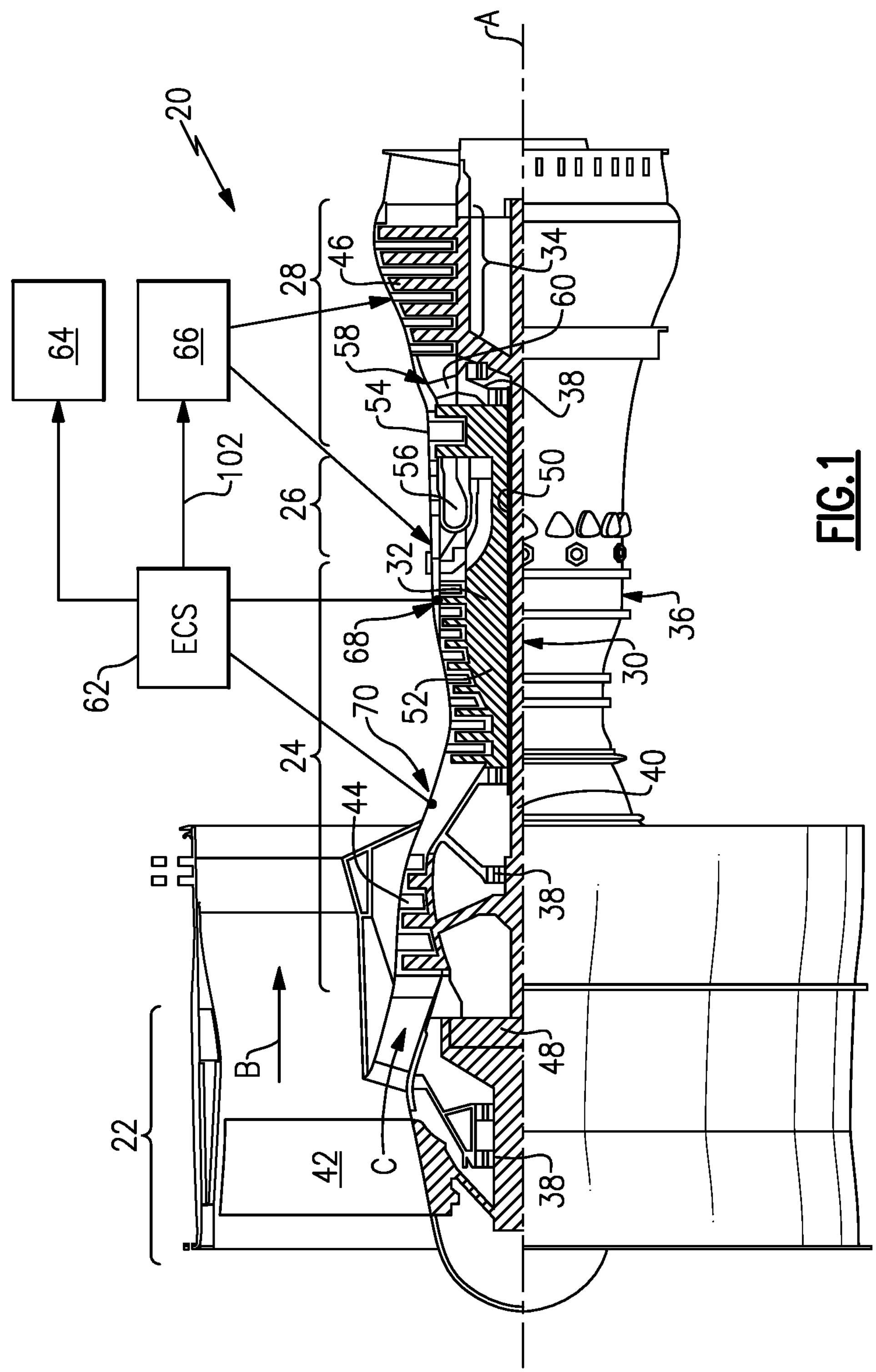
FIG. 1 schematically shows an embodiment of a gas turbine engine.

FIG. 1 schematically illustrates an example gas turbine engine 20 that includes a fan section 22, a main compressor section 24, a combustor section 26 and a turbine section 28. Alternative engines might include an augmenter section (not shown) among other systems or features. The fan section 22 drives air along a bypass flow path B while the main compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the main compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low pressure turbine to drive a fan directly or via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a “high pressure” compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

The disclosed example engine 20 includes a mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46. Although the disclosed example engine embodiment includes a mid-turbine frame 58, it is within the contemplation of this disclosure to provide a turbine section without a mid-turbine frame.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vane rows or stages in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

Fan pressure ratio is the total pressure ratio across the fan blade alone, without a Fan Exit Guide Vane ("FEGV") system. The fan pressure ratio as disclosed herein according to one non-limiting embodiment is less than about 1.50. In another non-limiting embodiment the fan pressure ratio is less than about 1.45.

Corrected fan tip speed is the actual fan tip speed in ft/sec divided by an industry standard temperature correction of $[(\text{Tram}\ ^\circ \text{R})/(518.7^\circ \text{R})]^{0.5}$. The corrected fan tip speed, as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

An environmental control system (ECS) 62 for use on an aircraft draws air from locations within the main compressor section 24 for use in various aircraft systems schematically indicated at 64. The ECS 62 draws airflow from a high pressure compression location 68 and a lower pressure location 70. The locations 68, 70 may both be within the high pressure compressor 52 or one may be in the lower pressure compressor section 44. The locations of both the higher pressure location and the lower pressure location depend on a desired pressure and temperature at each location. In this example, the higher pressure location 68 is downstream of the lower pressure location 70. Moreover, in this example air drawn from the higher pressure location 68 is at a higher temperature and pressure than air drawn from the lower pressure location 70.

An air buffer system 66 is provided that supplies pressurized air to various bearing locations in the engine 20. Pressurized air is provided to bearing compartments within the engine 20 to keep lubricant within the compartment and to maintain a desired temperature within the bearing compartment including the temperature of the bearing compartment walls. As appreciated, tapping of any air from the core engine flow requires a conduit and an opening through an engine static structure 36 or case. The example buffer system 66 includes a buffer passage 102 (FIG. 2) that includes an inlet from the ECS 62. By tapping air from the ECS 62, additional openings in the engine static structure 36 are not required. Moreover, the buffer system 66 uses a small percentage of air compared to the air drawn for the ECS 62 and thereby does not meaningfully reduce the efficiency of the ECS 62.

Figure 2:
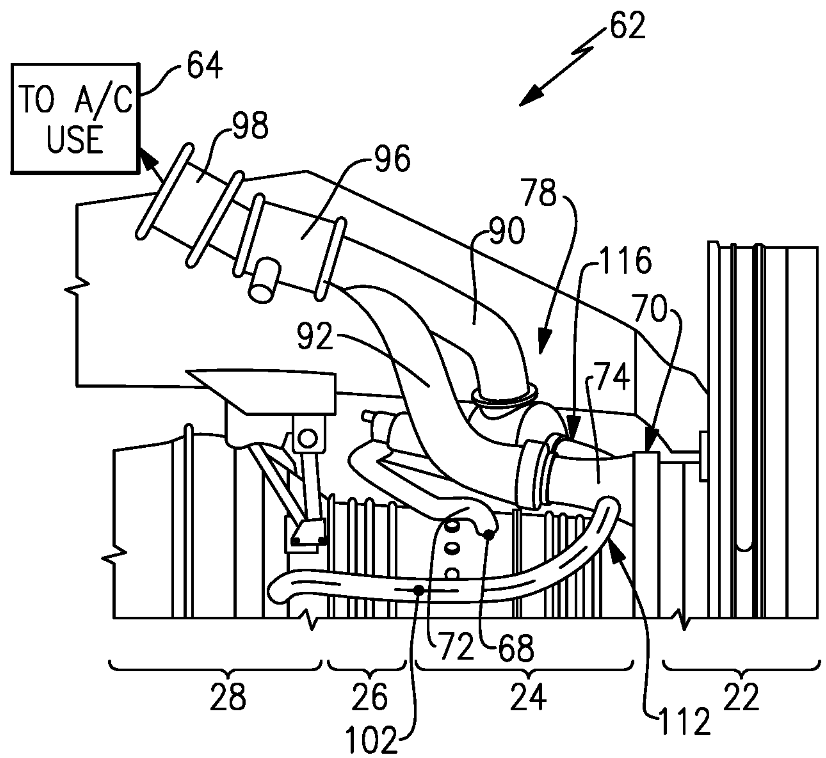
FIG. 2 shows an embodiment of an environmental control system for an aircraft.
Figure 3:
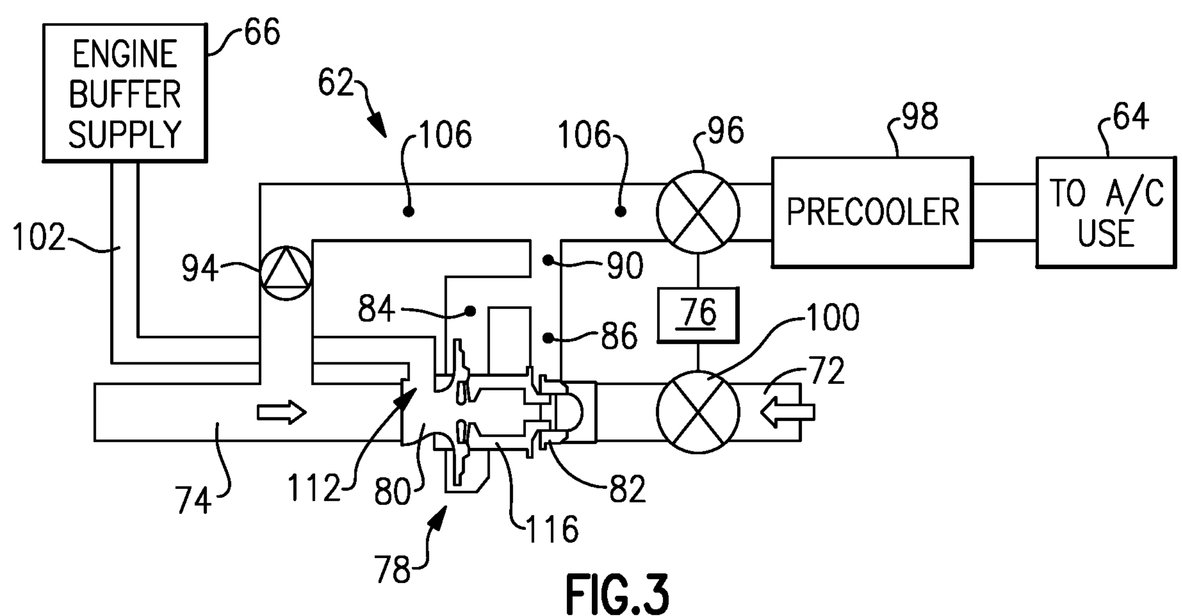
FIG. 3 shows a schematic of the environmental control system of FIG. 2.

Referring to FIGS. 2 and 3 with continued reference to FIG. 1, the ECS 62 includes a turbocompressor 78 with a compressor section 80 driven by a turbine section 82. The turbine section 82 and compressor section 80 are supported within a housing 116. The housing 116 may include a single part or multiple parts assembled together. The turbine section 82 receives airflow from the higher pressure location 68 through a high pressure tap 72. The compressor section 80 receives airflow from the lower pressure location 70 through a low pressure tap 74. The high pressure tap 72 and the lower pressure tap 74 are conduits that draw air from points within the main compressor section 24 and communicate that airflow to the turbocompressor 78.

The compressor section 80 compresses airflow from the lower pressure tap 74 to a higher pressure and exhausts the compressed airflow into a compressor outlet 84. The turbine section 82 receives higher pressure airflow from the high pressure tap 72 that is expanded to drive the turbine section 82, and thereby the compressor section 80. Airflow exhausted from the turbine section 82 is communicated through turbine outlet 86. Airflow exhausted from the turbine section 82 is mixed with airflow from the compressor section 80 to provide an intermixed airflow through a combined outlet 90.

The engine buffer system 66 includes the buffer air passage 102 through an opening 112 within the housing 116 upstream of the compressor section 80. The upstream opening 112 provides airflow through the air passage 102 and ultimately to the various bearing assemblies 38 disposed within the engine 20. Because the opening 112 is provided in the housing 116 of the turbocompressor 78, additional openings and/or taps are not needed within the engine static structure 36.

The buffer air system 66 provides airflow to areas of the engine that typically operate at elevated temperatures and pressures. The relatively cool low pressure air provided to the buffer system 66 from the opening 112 is directed to the applicable bearing system to maintain a temperature within the bearing compartment including bearing compartment wall temperatures at sufficiently low temperatures to prevent coking while the increased pressure is used to keep the lubricant within the compartment. Moreover, the buffer system 66 may include additional heat exchangers or pumps as required to further condition the temperature and pressure as needed for a particular bearing system location. In this example, the air passage 102 communicates relatively low pressure airflow to the buffer air system 66. Such low pressure airflow is utilized in low pressure regions of the engine 20 such as within the fan section 22 and low pressure turbine sections 46 along with other regions where lower pressure airflow is sufficient to maintain lubricant within applicable bearing compartment.

A first control valve 100 is provided in the higher pressure tap 72 to control airflow that drives the turbine section 82. A controller 76 directs operation of the first control valve 100 to open or close to control operation of the turbine section 82. With the first control valve 100 in an off position, the turbine section 82 is not driven and the compressor section 80 is stopped. Airflow from the lower pressure tap 74 is therefore communicated through check valve 94 to a bypass passage 92 and into a common conduit 106 to the aircraft system 64. When the first control valve 100 is open, the turbine section 82 drives the compressor section 80 and draws air from the lower pressure tap 74. The pressure differential generated by operation of the compressor section 80 causes the check valve 94 to remain closed and prevent airflow into the bypass passage 92.

A heat exchanger or precooler 98 is provided in the common conduit 106 to cool airflow to a temperature desired for the aircraft system 64. The ECS 62 includes a second control valve 96 that provides overall flow control to the downstream aircraft system. The controller 76 will direct the second control valve 96 to close to prevent airflow to the aircraft system 64 should airflow not be desired, or should the supplied airflow be outside of desired operating temperatures and pressures. Moreover, the valve 96 can be closed to stop airflow bypassing the turbocompressor 78 from entering the precooler 98 and aircraft systems in instances where the turbocompressor 78 is not operating.

Figure 4:
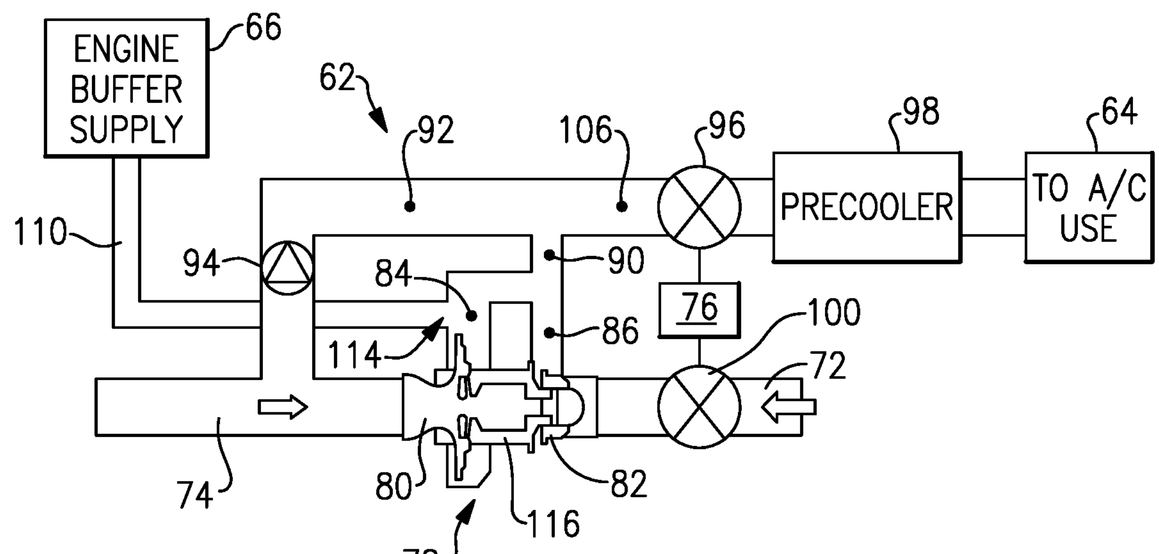
FIG. 4 is another embodiment of an environmental control system.
Figure 5:
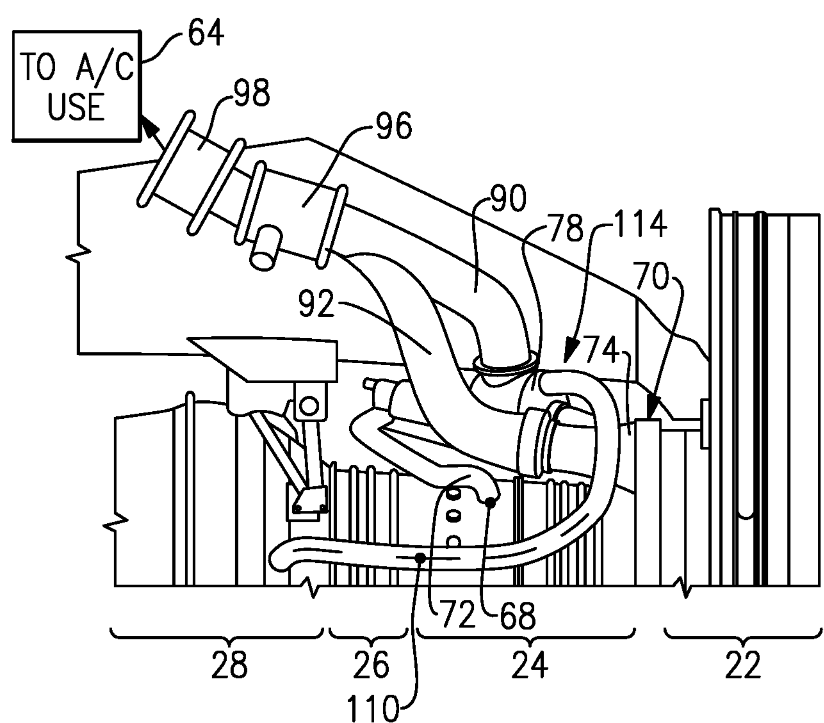
FIG. 5 is a schematic of the environmental control system of FIG. 4.

Referring to FIGS. 4 and 5, the example buffer system 66 includes a buffer air passage 110 that is in communication with an opening 114 within the housing 116 that is downstream of the compressor section 80. Air diverted into the buffer system 66 after the compressor section 80 is at an elevated pressure and temperature that enables use in higher pressure locations of the engine 20 such as within the high pressure compressor 52 and high pressure turbine 54. The higher pressure airflow provided after the compressor section 80 can therefore be utilized in locations within the engine requiring increased pressures to maintain conditions and some bearing locations within the engine. Drawing airflow that has already been compressed by the compressor section 80 can enable bleed air for use in higher pressure locations without further conditioning, or reduce any further conditioning that may be required.

Figure 6:
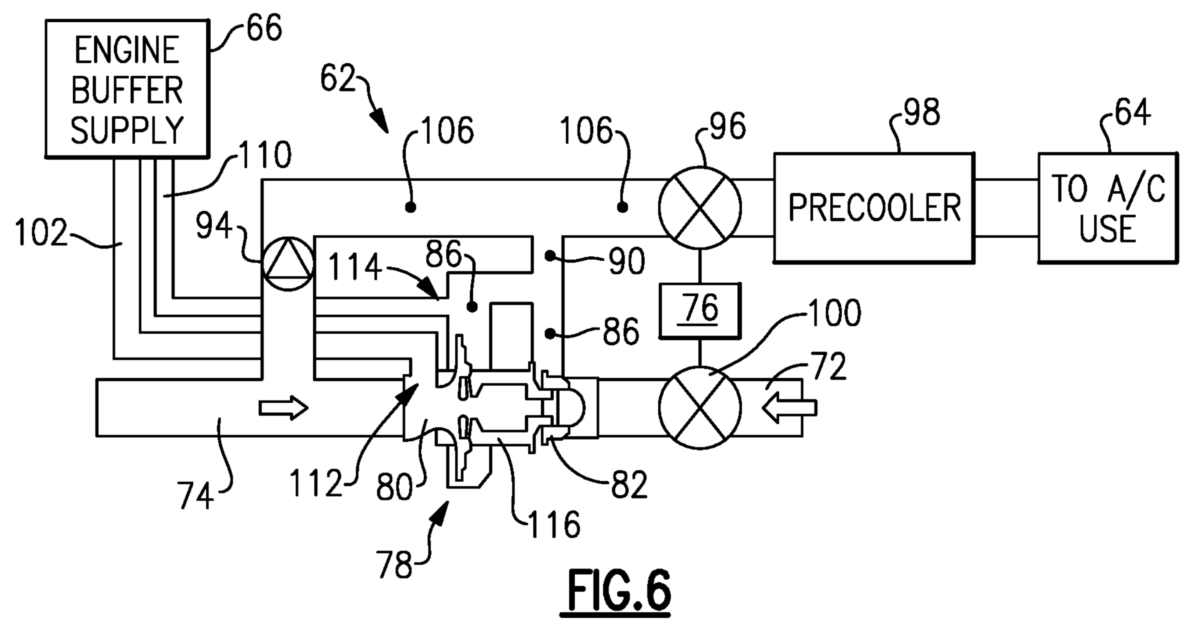
FIG. 6 is another embodiment of the environmental control system.
Figure 7:
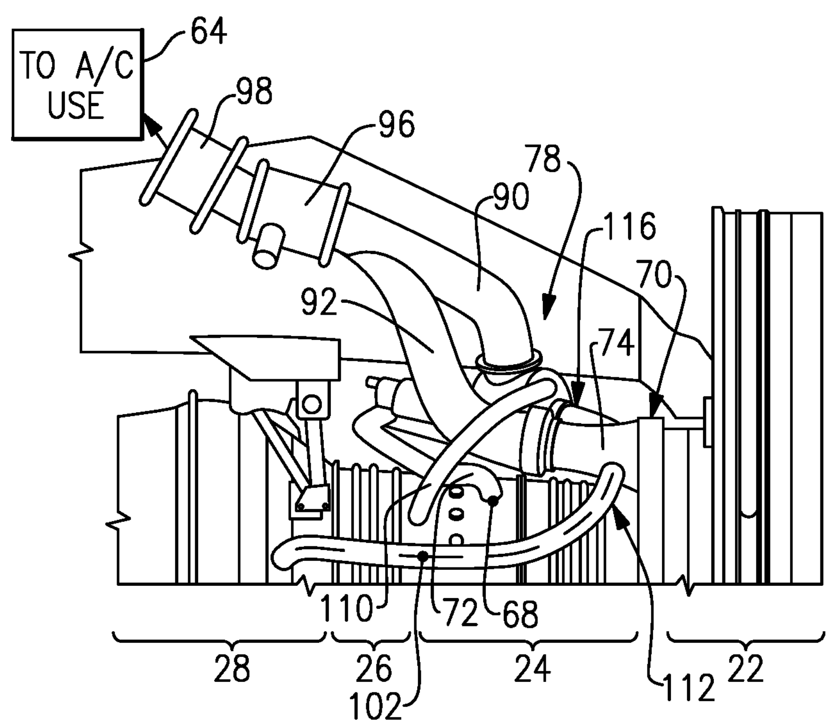
FIG. 7 is a schematic view of the of the environmental control system of FIG. 6.

Referring to FIGS. 6 and 7, the example buffer system 66 includes both the buffer air passage 110 that is in communication with an opening 114 within the housing 116 downstream of the compressor section 80 and the opening 112 that is provided upstream of the compressor section 80 similar to the embodiment disclosed in FIGS. 4 and 5. Airflow from after the compressor section 80 through passage 110 is at an elevated pressure and therefore useful for bearing compartments located within the engine that encounter relatively higher pressures such as within the high pressure compressor and high pressure turbine. Airflow from upstream of the compressor section 80 is at a lower pressure and is useful for lower pressure locations in the engine similar to the embodiment discloses in FIGS. 2 and 3. Accordingly, the buffer system 66 receives airflow from the turbocompressor 78 without additional openings in the engine structure suitable for use in bearing compartments requiring lower and higher pressure airflow.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An environmental control system for an aircraft comprising:

a higher pressure tap to be associated with a higher pressure location in a main compressor section associated with an aircraft engine, and a lower pressure tap to be associated with a lower pressure location in the main compressor section associated with the aircraft engine, said lower pressure location being at a lower pressure than said higher pressure location;

the lower pressure tap communicating to a first passage leading to a downstream outlet, and having a second passage leading into a compressor section of a turbocompressor;

the higher pressure tap leading into a turbine section of the turbocompressor such that air in the higher pressure tap drives the turbine section to in turn drive the compressor section of the turbocompressor;

a turbine outlet receiving an exhausted turbine airflow exhausted from the turbine section;

a compressor outlet receiving an exhausted compressor airflow exhausted from the compressor section;

a combined outlet receiving the exhausted turbine airflow from the turbine outlet and the exhausted compressor airflow from the compressor outlet intermixing the exhausted compressor and turbine airflows and passing a mixed airflow downstream to be delivered to the aircraft; and a buffer air outlet communicating a buffer airflow to an engine buffer air system, the buffer air outlet receiving the exhausted compressor airflow from the turbocompressor, the buffer air outlet disposed at a first location downstream of the compressor section of the turbocompressor and downstream of the lower pressure tap, wherein the turbocompressor includes a housing supporting the compressor section and the buffer air outlet is within the housing.

2. The environmental control system as set forth in claim 1, including a check valve controlling a bypass airflow from the lower pressure tap through the first passage between the lower pressure tap and the combined outlet.

3. The environmental control system as set forth in claim 2, wherein a first control valve is positioned on the higher pressure tap and is operable to control operation of the turbocompressor, wherein when the first control valve is an open position, a low pressure airflow is drawn into the compressor section of the turbocompressor from the lower pressure tap, and when the first control valve in a closed position, the low pressure airflow is not drawn through the compressor section of the turbocompressor and passes through the bypass passage.

4. The environmental control system as set forth in claim 2, including a second control valve controlling the mixed airflow to the aircraft.

5. The environmental control system as set forth in claim 4, wherein the second control valve is positioned downstream of a second location at which the first passage and the combined outlet intermix into a common conduit.

6. The environmental control system as set forth in claim 5, including a heat exchanger within the common conduit after the second control valve, the heat exchanger cooling a common airflow through the common conduit.

7. A gas turbine engine comprising:

a fan section delivering air into a main compressor section where the air is compressed and communicated to a combustion section where the air is mixed with fuel and ignited to generate a high energy flow that is expanded through a turbine section that drives the fan and main compressor section;

a bearing system disposed within a bearing compartment, the bearing system supporting rotation of a rotating shaft of the gas turbine engine;

an engine buffer air system communicating pressurized air to the bearing compartment; and an environmental control system including:

a higher pressure tap to be associated with a higher compression location in the main compressor section, and a lower pressure tap to be associated with a lower pressure location in the main compressor section, said lower pressure location being at a lower pressure than said higher pressure location;

the lower pressure tap communicating to a first passage leading to a downstream outlet, and having a second passage leading into a compressor section of a turbocompressor;

the higher pressure tap leading into a turbine section of the turbocompressor such that airflow through the higher pressure tap drives the turbine section of the turbocompressor to in turn drive the compressor section of the turbocompressor;

a turbine outlet receiving an exhausted turbine airflow from the turbine section of the turbocompressor;

a compressor outlet receiving an exhausted compressor airflow from the compressor section of the turbocompressor;

a combined outlet receiving the exhausted turbine airflow from the turbine outlet and the exhausted compressor airflow from the compressor outlet intermixing the exhausted turbine and compressor airflows and passing a mixed airflow downstream to be delivered to an aircraft; and a buffer air outlet communicating a buffer airflow to the engine buffer air system, the buffer air outlet receiving the exhausted compressor airflow from the turbocompressor, the buffer air outlet disposed at a first location downstream of the lower pressure tap and downstream of the compressor section of the turbocompressor, wherein the turbocompressor includes a housing supporting the compressor section of the turbocompressor and the buffer air outlet is within the housing.

8. The gas turbine engine as set forth in claim 7, including a check valve controlling a bypass airflow from the lower pressure tap through the first passage between the lower pressure tap and the combined outlet.

9. The gas turbine engine as set forth in claim 8, wherein a first control valve is positioned on the higher pressure tap and is operable to control operation of the turbocompressor, wherein when the first control valve is in an open position, a low pressure airflow is drawn into the compressor section of the turbocompressor from the lower pressure tap, and when the first control valve is in a closed position, the low pressure airflow is not drawn through the compressor section of the turbocompressor and passes through the bypass passage.

10. The gas turbine engine as set forth in claim 9, including a second control valve operable to control the mixed airflow to the aircraft.

11. The gas turbine engine as set forth in claim 10, wherein the second control valve is positioned downstream of a second location at which the first passage and the combined outlet intermix into a common conduit.

12. The gas turbine engine as set forth in claim 11, including a heat exchanger within the common conduit after the second control valve, the heat exchanger cooling a common airflow through the common conduit.

* * * * *